Figure 1:
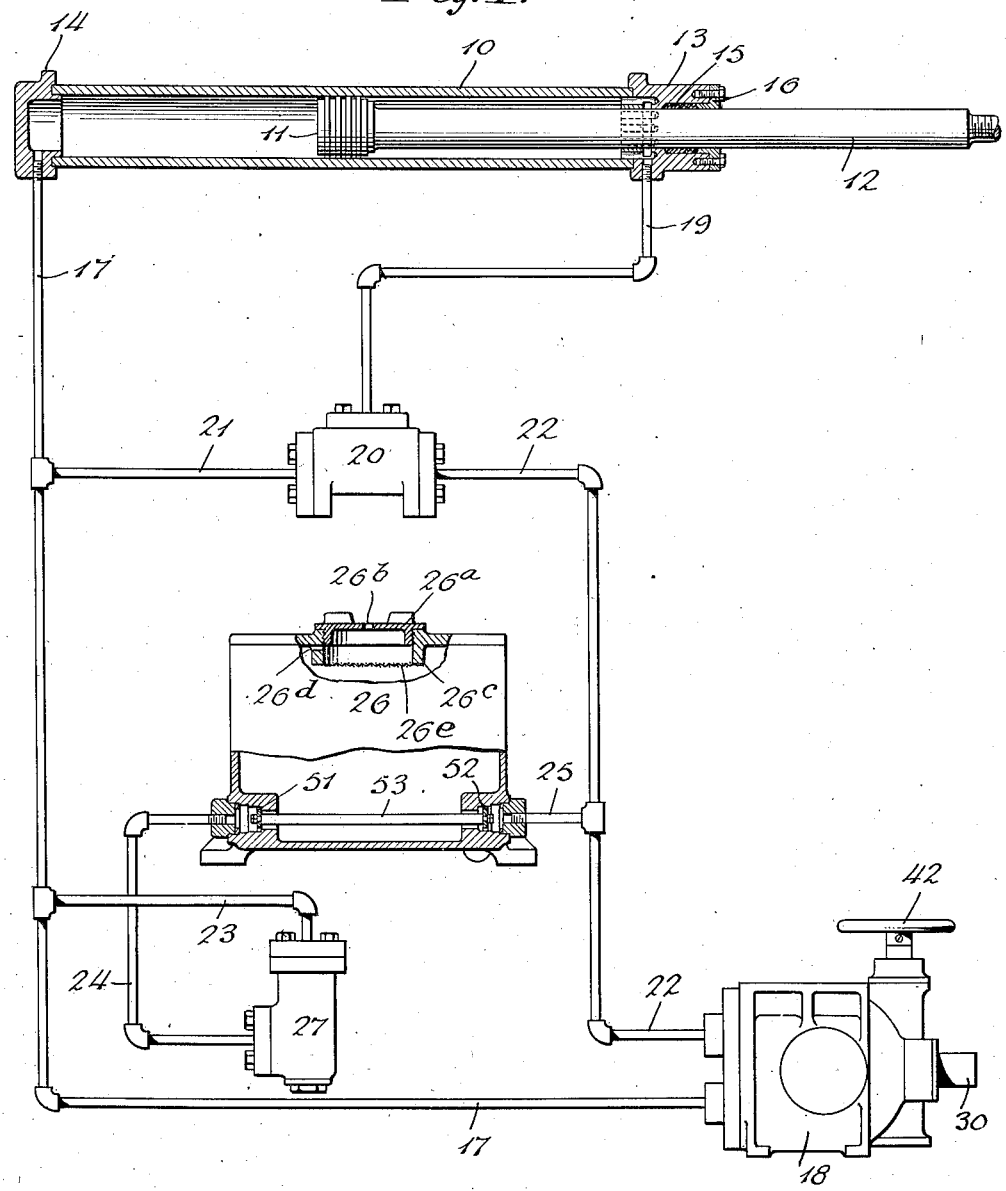

June 30, 1931.  A. L. ELLIS  1,812,587

DRIVING MECHANISM

Filed April 27, 1929  2 Sheets-Sheet 1

INVENTOR
ARTHUR L. ELLIS
BY
Lotka, Kehlenbeck & Darley
ATTORNEYS

June 30, 1931. A. L. ELLIS 1,812,587
DRIVING MECHANISM
Filed April 27, 1929 2 Sheets-Sheet 2

INVENTOR
ARTHUR L. ELLIS
BY
Lotka, Kehlenbeck & Darby
ATTORNEYS

UNITED STATES PATENT OFFICE

ARTHUR L. ELLIS, OF NEW ROCHELLE, NEW YORK, ASSIGNOR TO THE WATERBURY TOOL COMPANY, OF WATERBURY, CONNECTICUT, A CORPORATION OF CONNECTICUT

DRIVING MECHANISM

Application filed April 27, 1929. Serial No. 358,599.

This invention relates to driving mechanisms and particularly hydraulic driving mechanisms for machine tools of the type that includes a reciprocating member, for example, the ram of a broaching machine, shaper or the like, for moving the cutting tool through or across the work, or to machine tools of the type wherein the work is carried to the tool upon a reciprocating table as in planers or the like.

It is characteristic of machine tools of the types above referred to, for the tool to perform its cutting action on one traverse or stroke of the reciprocating member and to be inactive on the reverse traverse, or, as it is commonly termed, the return stroke. As the tool is inactive on the return stroke it becomes of the utmost importance particularly from the standpoint of present-day, high-speed production methods, to increase the speed of the reciprocating member to the maximum on its return stroke in order to reduce the periods of inactivity of the tool to a minimum and thereby speed-up production. In hydraulically driven tools as heretofore constructed and particularly where the tool is pulled upon its working stroke, the quick return of the tool has usually been effected either by making the pull or piston rod hollow and using it as a cylinder in co-operation with an auxiliary piston inserted from the rear end of the main cylinder or by employing auxiliary small cylinders arranged parallel to the main cylinder. While a faster speed on the return stroke than on the working stroke is secured by such expedients manufacturing operations are complicated and as a result construction costs are appreciably increased by their use.

The principal object of the present invention is to provide a new and improved hydraulic driving mechanism for a reciprocating machine tool in which the use of the complicated expedients heretofore employed for speeding up the return stroke are not only avoided but in addition a higher rate of speed on such stroke may be secured.

A further object is to provide a hydraulic drive especially adapted for reciprocating machines of the pull stroke type by which a smoother action of the reciprocating member may be secured.

Another object is to provide a drive of the character set forth in which the construction is of marked simplicity and of comparatively low manufacturing cost.

A further object is to provide a new and improved hydraulic drive which includes means for maintaining a slight back pressure on the suction side in order to obtain forced replenishing of the pump cylinders.

Figure 2:
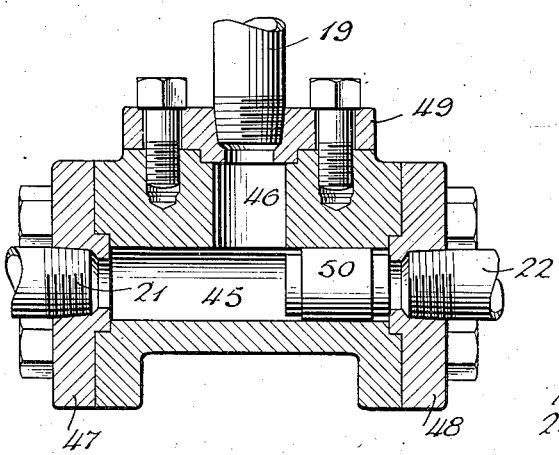
Figure 3:
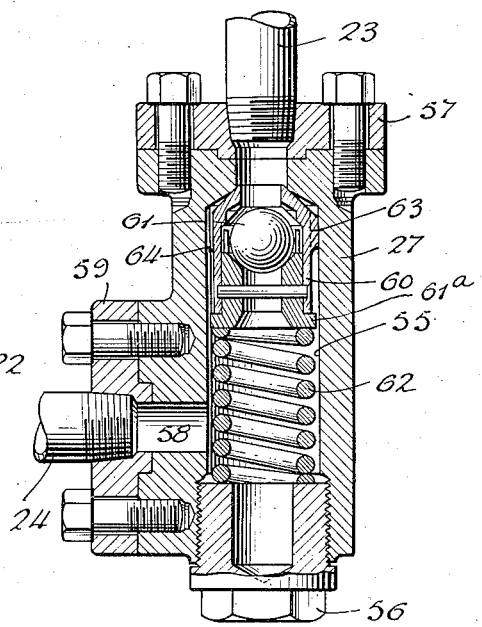
Figure 4:
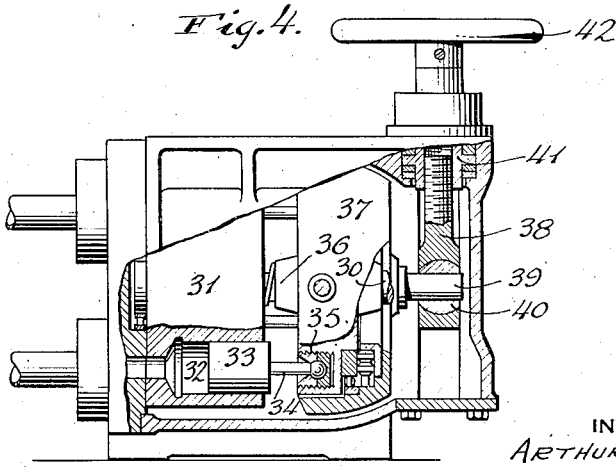

These and other objects of the invention will appear more fully from the following more detailed description and by reference to the accompanying drawings forming a part hereof wherein Fig. 1 is a somewhat diagrammatic plan view showing a hydraulic drive installation embodying the principles of the present invention; Fig. 2 is a central sectional detail of a shuttle valve that forms part of the installation; Fig. 3 is a central sectional detail of a replenishing valve and Fig. 4 is a detail partly in section and partly in elevation of the pump unit of the drive.

As shown in the drawings the numeral 10 indicates a hydraulic cylinder in which is mounted for reciprocation a piston 11 having a piston rod 12. The piston rod 12 is adapted to be secured to the reciprocating member of the machine tool, a table, for example, or in the case of, for instance, a broaching machine, the cutting tool may be secured in a tool head carried by said piston rod. As shown the cylinder 10 is provided with cylinder heads 13, 14 the head 13 having a central bore for the passage of the piston rod and also being counterbored to provide a stuffing box in which suitable packing 15 is placed and held in position by a packing gland 16. The head 14 forms a closure for the other end of the cylinder.

Screwed into the head 14 is one end of a pipe line or conduit 17, the other end of which is connected to the pump 18. A pipe line 19 has one end thereof connected to the cylinder head 13, the other end of said pipe line 19 being connected to a shuttle valve 20, the constructional details of which will hereinafter be more fully described. Connected to the shuttle valve are two pipe lines or conduits 21, 22; the conduit 21 leading to the conduit 17 and the conduit 22 leading to the pump 18.

Connected across the conduits 17 and 22 by means of the pipes 23, 24 and 25 is an expansion tank or reservoir 26 and a back pressure valve 27. The expansion tank 26 is provided with a closure 26$^a$ having an opening 26$^b$ to atmosphere. A skirt 26$^c$ extends below the closure 26$^a$ and is provided with air holes 26$^d$. A wire mesh screen 26$^e$ is preferably secured on the bottom of the skirt 26$^c$ to prevent oil in the tank from splashing out through the opening 26$^b$.

The pump 18 is of the well known Waterbury type and as shown in Fig. 4 consists of a casing or housing in which is rotatably mounted on a driving shaft 30, a cylinder barrel 31. The barrel 31 is provided with a plurality of cylinders 32 in each of which is slidably mounted a piston 33 connected by a piston rod 34 with a swash plate 35. The latter is connected in driving relationship with the driving shaft by means of an universal joint 36 and is rotatably mounted within a tilting box 37. The angular position of the tilting box 37 with respect to the driving shaft may be adjusted by means of a control shaft 38 to the lower end of which the tilting box is connected by a stub shaft 39 and rocking bearing 40. At its upper end the control shaft screws into a nut 41 mounted for rotation in the pump casing but held against axial movement. Secured to the nut 41 is a hand wheel 42, rotation of which obviously will produce a longitudinal movement of the control shaft 38 and thereby a change in the angular position of the tilting box and swash plate. With the driving shaft rotating in a given direction and with the control shaft set to the position shown in Fig. 4 with the tilting box and swash plate perpendicular to the driving shaft 30 the pistons 33 will have no stroke and the pump is in its "neutral" position. When, however, the control shaft is adjusted to cause the tilting box and swash plate to be inclined in either direction from the perpendicular or neutral position, the pistons will be reciprocated and fluid will be pumped by the pump through either of the pipes 17 or 22, the direction of flow depending upon the direction in which the control shaft and tilting box have been moved and the rate of flow depending upon the direction in which the control shaft and tilting box have been moved and the rate of flow depending on the extent of inclination given to said tilting box; obviously the greater the extent of inclination the greater will be the stroke of the pistons and the output of the pump.

The shuttle valve 20 hereinbefore referred to consists of a valve casing provided with a longitudinal bore 45 and a lateral or branch bore 46. The ends of the bore 45 are closed by heads 47, 48 suitably bolted of the main casing and provided with central screw-threaded apertures into which the ends of the pipes 21, and 22 respectively, are threaded. The lateral bore 46 is closed by a valve head 49 also screwthreaded for the reception of the end of the conduit 19. A valve plug 50 is slidably mounted within the bore 45 and is adapted to be held against the inner face of the head 47 or 48 according to whether the pipe 22 or the pipe 21 respectively is under pressure. It will be understood that a fluid tight joint is made between the end faces of the valve plug and the inner faces of the valve heads 47, 48. When the valve 50 is shifted by the pressure to either end of the valve casing communication will be established between the pipe at the other end of the bore 45 and the pipe 19.

The expansion tank 26 is preferably located at the highest point of the entire system and acts as a reservoir for an excess of the fluid employed, for example, oil, so as to insure that all of the pipe lines, the ram cylinder, and the pump will be at all times filled with fluid and the presence of air pockets avoided. The communication between the reservoir 26 and the pipes 24, 25 connected to said reservoir is under the control of a shifting valve consisting of a pair of valve members 51, 52 secured to the ends of the valve rod 53. The valve members 51, 52 are mounted within valve chambers formed in the walls of the reservoir and are adapted to seat against valve seating surfaces formed in said chambers. It will be noted by referring to the drawings that the valve members are so located on the valve 53 that when one valve is seated or closed the other valve is unseated or open.

The manner in which the valves 51, 52 function will be presently described.

The back pressure valve 27 as shown in Fig. 3 of the drawings consists of a valve casing having a bore 55, one end of which is closed by a screw plug 56. To the other end of the valve casing is secured a coupling flange 57 having a screwthreaded aperture for the end of the pipe or conduit 23. The valve casing is also provided with a lateral bore 58 with which communicates the center aperture of a coupling flange 59 suitably secured to the valve casing and serving to secure the pipe or conduit 24 of the valve to the valve casing.

Mounted within the bore 55 of the valve casing of the valve 27 is a valve cage 60 in which is mounted a ball valve 61 adapted to seat against a valve surface formed on a plug 61$^a$ secured to said cage; in order to guide the ball valve 61 in its movements suitable guide pins may project from the one end face of the plug 61$^a$ as shown in Fig. 3. The valve cage 60 is provided at one end with a valve seating surface normally held by means of a coiled compression spring 62 against a co-operating valve surface formed adjacent to one end of the bore 55. The cage 60 is provided on its periphery with a plurality of longitudinally extending ribs 63, the channels 64 formed between said ribs and the bore 55 forming passageways for the fluid.

The operation is as follows: The parts are shown in Fig. 1 in the positions which they occupy upon a return stroke. Oil under pressure from the pump 18 is forced through the pipe line 17 to the ram cylinder 10 to exert pressure on the large end of the piston 11. The pressure of the oil in the pipe 17 is communicated through the pipe 21 to the shuttle valve 20 causing the valve plug 50 to be forced to the right and into contact with the inner face of the valve head 48. As the piston 11 is moved towards the right by the pressure of the fluid on the large end thereof the oil will be forced out of the cylinder on the piston rod side of the piston, such oil flowing through the pipe 19, lateral bore 46 and bore 45 of the valve casing to the pipe line 21 and pipe line 17. The pressure in the oil in the pipe line 17 is communicated through the pipe 23, back pressure valve 27, and pipe 24 to cause the shuttle valve in the expansion tank 26 to be forced to the right, valve 51 therefore being closed and valve 52 open. None of the oil therefore can pass to the expansion tank from line 17. As the valve 52 is open oil may flow from the expansion tank 26 through the pipe 25 to the pipe line 22 and thence to the pump. As the oil from the piston rod side of the ram cylinder 10 is returned directly to the pipe 17 without passing through the pump it will be obvious that the pump needs only to supply a volume of fluid equal to that of the piston rod. It will therefore be seen that when the pump is adjusted to deliver its full output on the return stroke that the rate of speed of the reciprocating member actuated by the piston may be made very much higher on the return stroke than on the working stroke. To insure this result the cross-sectional area of the piston rod 12 is not greater than one half the cross-sectional area of the piston 11.

On the working stroke oil under pressure is forced through the pipe line 22 causing the shuttle valve 50 to be thrown to the left hand side of the bore 45 of the valve 20, the oil passing through the valve casing to the pipe line 19 and the right hand or piston rod end of the ram cylinder 10. The shuttle valve of the expansion tank 26 is forced to the left, valve 52 being closed and valve 51 open. The oil forced out of the left hand of the cylinder 10 flows through the pipe 17 part of such oil going to the suction side of the pump and the other part passing through the pipe 23 through the back pressure valve 27 and pipe line 24 to the expansion tank. As the volume of oil flowing from the left hand end of the cylinder is much greater than the volume of oil flowing to the right hand end thereof, the excess oil must flow to the expansion tank. It will be noted that the construction of the back pressure valve 27 is such that throttling of the oil passing through the pipe 23 is secured, thereby securing a back pressure of the oil in the pipe 17 which gives forced replenishing on the suction side of the pump and also maintains a back pressure upon the piston which insures a smoother action of the operation of the piston on the working stroke thereof. The throttling of the oil which passes through the pipe 23 it will be noted is effected by the fact that the oil flowing from said pipe to the valve 27 passes into the valve cage 60 holding the ball valve 61 to its seat on the plug 61ª, thereby preventing any flow through the cage past the ball 61. The pressure of this oil will, however, force the cage 60 downwardly against the pressure of the spring 62, thus moving the valve seating surface, shown at the upper end of said cage, out of contact with its co-operating surface and permitting the oil to flow through the channels 64 and between the sides of the valve cage and the walls of the bore 55 to the lateral bore 58 and thence to the pipe 24 from which it flows to the expansion tank. It will be seen that as no oil can flow through the back pressure valve 27 from the pipe 23 to the pipe 24 unless the valve cage 60 is moved downwardly against the spring 62, a back pressure will be maintained on the oil in pipe 17 during a working stroke, the extent of such pressure being determined by the pressure exerted by said spring to hold said cage in its seated or closed position and that this pressure may be varied by adjustment of the plug 56. Whereas if the oil tries to flow from the pipe 24 to the pipe 23 the ball valve will be lifted from its seat to permit the free flow of the oil in this direction.

It will be understood that the constructional details of the cylinder and piston shown are merely illustrative of a general type of mechanism and that the details of such members as well as the constructional details of the other component parts of the systems shown may be changed, varied or modified without departing from the principles of the invention.

I claim:

1. In a hydraulic drive for a reciprocating member, a fluid pressure cylinder and differential piston adapted to develop a working stroke in the direction of its larger end, a reversible pump for supplying fluid under pressure to either end of said cylinder, pipe lines connecting said pump and cylinder, and a spring pressed valve located in the pipe line under suction during the working stroke of the piston to maintain a back pressure on said piston during said working stroke and thereby insure a smooth working action of said piston.

2. In a hydraulic drive for a reciprocating member, a fluid pressure cylinder and differential piston adapted to develop a working stroke in the direction of its larger end, a reversible variable delivery pump for supplying fluid under pressure to either end of said cylinder, pipe lines connecting the ends of said cylinder to said pump, an expansion tank connected across said pipe lines, a spring pressed back pressure valve connected in series with said expansion tank, said valve being connected between said tank and the pipe line which is under suction when the piston is performing a working stroke, and means co-operating with said back pressure valve to control the admission and exit of fluid to and from said expansion tank.

3. In a hydraulic drive for a reciprocating member, a fluid pressure cylinder and differential piston adapted to develop a working stroke in the direction of its larger end, a reversible variable delivery pump for supplying fluid under pressure to either end of said cylinder, pipe lines connecting the ends of said cylinder to said pump, an expansion tank connected across said pipe lines, a spring pressed back pressure valve connected in series with said expansion tank, said valve being connected between said tank and the pipe line which is under suction when the piston is performing a working stroke, and connected shuttle valves co-operating with said back pressure valve to control the admission and exit of fluid to and from said expansion tank.

4. In a hydraulic drive for a reciprocating machine of the type wherein the actuating member is placed under tension on the working stroke, a fluid pressure cylinder, a piston slidable in said cylinder and having one end face free, a piston rod secured to the other end face of said piston and projecting from one end of said cylinder, a reversible variable delivery fluid pressure pump, pipe lines connecting said pump with the ends of said cylinder, and means directly acted upon by the pressure fluid for causing the fluid from the piston rod end of the cylinder to be by-passed to the other end thereof on the return stroke of said piston.

5. In a hydraulic drive for a reciprocating machine of the type wherein the actuating member is placed under tension on the working stroke, a fluid pressure cylinder, a piston slidable in said cylinder and having one end face free, a piston rod secured to the other end face of said piston and projecting from one end of said cylinder, said piston rod having a cross-sectional area which is not greater than one half the cross-sectional area of the piston, a reversible variable delivery fluid pressure pump, pipe lines connecting said pump with the ends of said cylinder, and means to cause the piston to be actuated on its return stroke at a faster rate than on its working stroke, said means including a by-pass across said pipe lines and connecting the two ends of said cylinder and a valve automatically operated by the pressure effective in said cylinder to control said by-pass.

6. In a hydraulic drive for a reciprocating machine of the type wherein the actuating member is placed under tension on the working stroke, a fluid pressure cylinder, a piston having a piston rod secured thereto and projecting from one end of said cylinder, said piston rod having a cross-sectional area which is not greater than one half the cross-sectional area of the piston, a reversible variable delivery fluid pressure pump, pipe lines connecting said pump with the ends of said cylinder, and means to cause the piston to be actuated on its return stroke at a faster rate than on its working stroke, said means including a by-pass across said pipe lines and connecting the two ends of said cylinder, and a valve in said by-pass automatically responsive to fluid pressure conditions within said pipe lines for permitting the fluid from the piston rod end of the cylinder to be returned directly to the other end of said cylinder on said return stroke without passing through said pump.

7. In a hydraulic drive for a reciprocating machine, a cylinder, a piston having a piston rod projecting from one end thereof through one end of said cylinder and adapted to develop a working stroke in the direction opposite to that in which the piston rod projects, a reversible, variable delivery pump for supplying fluid under pressure to either end of said cylinder, pipe lines connecting the ends of said cylinder with said pump, an expansion tank including a shuttle valve connected with said cylinder, a back pressure valve in series with said expansion tank, and co-operating with said shuttle valve to control the admission and exit of fluid to and from said expansion tank, said valve being connected with said tank and the pipe line which is under suction when the piston is performing a working stroke, and a second shuttle valve connected across said pipe lines with said cylinder and expansion tank for controlling the supply of fluid to said cylinder.

8. In a hydraulic drive for a reciprocating member, a fluid pressure cylinder and differential piston adapted to develop a working stroke in the direction of its larger end, a reversible pump for supplying fluid under pressure to either end of said cylinder, pipe lines connecting said pump and cylinder, and means for maintaining a back pressure on said piston during the working stroke thereof and to give forced replenishing to the pump on said stroke.

9. In a hydraulic drive for a reciprocating member, a fluid pressure cylinder and differential piston adapted to develop a working stroke in the direction of its larger end, a reversible pump for supplying fluid under pressure to either end of said cylinder, pipe lines connecting said pump and cylinder, and a spring pressed valve connected to the pipe line under suction during the working stroke of said piston for maintaining a predetermined pressure in said line.

In testimony whereof I have hereunto set my hand.

ARTHUR L. ELLIS.